United States Patent [19]

Hoffmueller et al.

[11] Patent Number: 4,980,241
[45] Date of Patent: Dec. 25, 1990

[54] FOIL INSERT IN A JOINT BETWEEN MACHINE COMPONENTS

[75] Inventors: Wilhelm Hoffmueller, Munich; Josef Eichner, Scheyern, both of Fed. Rep. of Germany

[73] Assignee: MTU Motoren-und Turbinen-Union Muenchen GmbH, Munich, Fed. Rep. of Germany

[21] Appl. No.: 346,891

[22] Filed: May 2, 1989

[30] Foreign Application Priority Data

May 10, 1988 [DE] Fed. Rep. of Germany ....... 3815977

[51] Int. Cl.$^5$ .................. B32B 15/00; F16J 15/00
[52] U.S. Cl. .................... 428/607; 428/606; 428/687; 384/626; 277/236
[58] Field of Search ............ 277/96.1, 96.2, 236, 277/234, 235 R; 384/626; 428/587, 591, 607, 606, 608, 687, 609, 612, 636, 637, 638, 621, 627, 632; 416/248, 224

[56] References Cited

U.S. PATENT DOCUMENTS

| | | | |
|---|---|---|---|
| 1,933,050 | 10/1933 | Darrach | 384/626 |
| 1,951,730 | 3/1934 | Johnson | 384/626 |
| 2,289,620 | 7/1942 | Bernstein | 277/234 |
| 2,299,813 | 10/1942 | Franks | 277/234 |
| 2,627,649 | 2/1953 | Matthysse | 428/937 |
| 3,088,192 | 5/1963 | Turner | 29/156.8 |
| 3,135,128 | 6/1964 | Rudolph | 277/96.2 |
| 3,273,905 | 9/1966 | Chapman et al. | 277/96.1 |
| 3,330,568 | 7/1967 | Wetzel | 277/236 |
| 3,595,588 | 7/1971 | Rode | 277/236 |
| 3,810,637 | 5/1974 | Bonvin | 428/937 |
| 4,040,770 | 8/1977 | Carlson | 416/248 |
| 4,051,585 | 10/1977 | Walker et al. | 228/193 |
| 4,196,913 | 4/1980 | Oka | 277/236 |
| 4,664,600 | 5/1987 | Perry | 416/224 |
| 4,810,591 | 3/1989 | Sakai | 277/236 |
| 4,822,057 | 4/1989 | Chia et al. | 277/96.2 |

FOREIGN PATENT DOCUMENTS

| | | | |
|---|---|---|---|
| 1052758 | 3/1959 | Fed. Rep. of Germany | 277/236 |
| 712786 | 7/1954 | United Kingdom | 277/236 |

Primary Examiner—John J. Zimmerman
Attorney, Agent, or Firm—W. G. Fasse; D. H. Kane, Jr.

[57] ABSTRACT

A foil intermediate layer is arranged between machine parts forming a joint to protect the machine parts against fretting corrosion. The foil intermediate layer includes at least two foils or plies of which the respective inner contact surfaces contacting each other, have a lower coefficeint of friction and a higher resistance to wear and abrasion, than the respective outer surfaces of the foils or plies contacting the joint forming surfaces of the machine parts. Thus, relative motion between the machine parts forming the joint under oscillating loads or vibrations, is transmitted to the easily gliding wear resistant contact surfaces of the plies so that the machine parts are protected from fretting corrosion, whereby their operating lifetime is increased.

16 Claims, 4 Drawing Sheets

FOIL INSERT IN A JOINT BETWEEN MACHINE COMPONENTS

FIELD OF THE INVENTION

The invention relates to a foil insert in a joint between machine components, especially for preventing fretting corrosion, for example in the joint between turbine blades and a turbine rotor.

BACKGROUND INFORMATION

A so-called compact foil intermediate layer comprises a single foil positioned in a joint between adjoining machine parts which are subject to chafing or friction or fretting corrosion. The foil prevents a direct surface contact between neighboring parts which are subject to oscillations and/or vibrations. However, the material of the single foil is subjected, in addition to changing compression loads, to increased shearing forces due to the effects of the fretting corrosion. Therefore, the single foil intermediate layer has a relatively short working lifetime due to the resultant fretting corrosion and microcrack formation so that the foil must be replaced frequently. Another method of protecting adjoining machine parts against fretting corrosion is disclosed in the German Patent Publication No. (DE-PS) 3,133,158, wherein an independent foil intermediate layer is not used. Rather, a material is introduced into the joint between the machine parts by a method as disclosed in No. (DE-PS) 3,133,158 so that the material forms an intermediate layer which adheres to the surfaces of the parts to be protected. The intermediate layer thus forms a mechanical unit with both part surfaces so that disadvantageously the parts cannot be disassembled without breaking and destroying the formed intermediate layer. A further disadvantage of such an adhering intermediate layer is that microcracks are caused in the intermediate layer due to high shear forces during vibrational loading. Further, due to the mechanical adhesion or bonding the microcracks can propagate into the material of the machine parts to be protected. Thus, the intermediate layer fails to serve its important function and the working lifetime of the machine parts to be joined is reduced.

German Patent Publication No. (DE-PS) 3,236,376 discloses a further development of such an adhering protective layer or coating, whereby the surfaces of the machine parts to be joined are separately coated with a protective coating of, for example, copper, silver, or aluminum. A disadvantage of these protective coatings is also the propagation of microcracks caused by fretting corrosion into the parts themselves.

OBJECTS OF THE INVENTION

In view of the above it is the aim of the invention to achieve the following objects singly or in combination:

to provide a foil intermediate layer to be placed in joints between oscillating and/or vibrating machine parts in order to reduce or prevent fretting corrosion and microcrack formation on the surfaces of the machine parts forming the joint;

to achieve a long operating lifetime and easy exchangeability or replaceability of such foil intermediate layers and of the machine parts;

to allow such a foil intermediate layer to be removed from a joint without destroying the foil so that it may be reused in another or the same joint;

to provide two foil layers in a joint between machine parts for taking up vibration effects between the contacting surfaces of the two neighboring foil layers;

to prevent any microcracks or other defects which may arise in the intermediate foil layers from propagating into the material of the machine part to be protected; and to appropriately choose a material for the foil intermediate layer and to appropriately treat the surfaces of the foil material so that it is suitable for operation at temperatures above 400° C. and operating pressures up to $20 \times 10^5$ N/m$^2$ without undergoing any plastic deformation and so that the material of the foil remains impact notch resistant and temperature resistant.

SUMMARY OF THE INVENTION

The above objects have been achieved according to the invention by using at least a two-ply foil intermediate layer whereby the two plies are so constructed that their mutually contacting surfaces have a lower coefficient of friction and are more abrasion resistant than the respective outer surfaces of the plies in contact with the machine parts. Thereby, the outer surfaces of the plies having a greater coefficient of friction are pressed in a slip-free manner against the machine part surfaces forming the joint so as to impede any microscopic relative motion between the machine part surface and the respective outer foil surface. Such motions tend to arise due to the oscillating and vibrating loads applied to the joint. However, according to the invention these microscopic relative motions are allowed to be effective between the inner foil contact surfaces of the foil layers directly contacting each other. For this purpose these inner surfaces according to the invention have a lower coefficient of friction than the outer surfaces of the plies, the fretting corrosion is reduced and shearing forces which might otherwise damage the foil plies are reduced. Furthermore, because the inner contact surfaces of the foil plies are more abrasion resistant than the rest of the foil layer material, an increased operating lifetime is achieved in the two-ply intermediate layer according to the invention compared to prior art intermediate layers.

According to the invention the fretting corrosion effect on the machine part surfaces is transferred to the inner contact surfaces of the replaceable foil plies. The invention has several advantages over the joint formed with adhering intermediate layers according to German Patent Publication No. (DE-PS) 3,133,158, namely that microcracks which may form in the intermediate layer cannot simply propagate into the material of the machine parts, and that damaged foil plies are easily exchangeable or replaceable according to the invention by simply removing old plies and inserting new plies at necessary maintenance intervals. Moreover, undamaged foil plies may be reused.

The invention also has advantages over the joint formed by adhering coatings on the surfaces of machine parts forming the joint, according to German Patent Publication No. (DE-PS) 3,236,376. Namely, microcracks which may form due to fretting corrosion in the foil plies can only propagate to the outer surfaces of the foil plies so that the material of the machine part remains protected.

Compared to a single layer the multi-ply foil intermediate layer according to the invention also has advantages, because the present multi-ply arrangement according to the invention dissipates, in the inner contact plane between the two foil plies, any shear forces which may arise due to tangential relative movements between the machine parts during oscillating or vibrating loading. Thus, the operating lifetime and the economy of the present multi-ply foil is increased relative to the prior art, wherein shear forces effective within the single-ply foil intermediate layer cause rapid failure.

On the one hand, the foil intermediate layer must be fit enough to distribute and withstand peak loads, but on the other hand, it must be thin enough to transmit and withstand loads without undergoing plastic creep or deformation of the multi-ply layers in the joint. These requirements are satisfied by foil intermediate layers having a ply thickness in the range of 0.01 mm to 0.5 mm. The material characteristics of the specific material of which the foil plies are made has a considerable influence on the optimal foil ply thickness. If two plies are used the layer thickness would be 0.02 mm to 1.0 mm. When the foil layers are made of high grade foil materials such as stainless steel, nickel based alloys, or cobalt based alloys, the optimal foil ply thickness is between 0.03 mm and 0.07 mm.

It is advantageous if the foil layers are made of the same type of material as the machine parts to be joined to prevent undesirable material creep or flow due to the formation of galvanic elements.

Furthermore, the outer surfaces and the inner contact surfaces of the foil plies are differently machined or treated. In order to increase the coefficient of friction of the respective outer surface of the foil plies, the outer surfaces are advantageously abraded or peened by blasting with sharp abrasive particles, for example, by sandblasting the outer surfaces. Spherically shaped particles are suitable for the blasting. On the other hand, the inner contact surfaces are machined smooth and, for example, polished to a high reflecting finish for advantageously decreasing the coefficient of friction between the ply surfaces contacting each other.

If the material of the machine parts to be joined is not a suitable material for the foil intermediate plies, then it is preferable to use as the material for the foil plies stainless steels, especially chrome-nickel-molybdenum-steels, such as X12 Cr Ni Mo 12, or 0.1 C-12 Cr-2.5 Ni-1.8 Mo, or also chrome-nickel-titanium-steels such as 0.1 C-18 Cr-9Ni-0.4 Ti. These materials are temperature resistant and resistant to notching impacts. Hence, these materials satisfy the requirements to be met by the foil layer according to the invention.

Nickel based materials such as 0.1C-22 Cr-18 Fe-9 Mo (Tradename Hastelloy), or 0.06 C-20 Cr-6 Mo-2 Ti-0.5 Al (Tradename C), or 0.1 C-20 Cr-18 Co-2.5 Ti-1.5 Al (Tradename Nimonic 90) have the advantage that they are hard and strong materials which may be used at temperatures and pressures above the limit values noted above.

Cobalt based materials such as 0.1 C-20 Cr-15 W-10 Ni (Tradename Haynes Alloy 25) have the advantage that they are especially impact resistant even at high temperatures and have been proven advantageous as the base material for the foil intermediate plies according to the invention.

According to a special embodiment of the invention the foils or plies are made of the above mentioned base materials so as to have an amorphous structure. Such materials are referred to herein as glass-metals. One example is a glass-metal made of iron nickel boron alloys which have an advantageous machineability relative to similar foils having a crystalline structure. Incidentally, the connotation of the term "foil" in this context is intended to include sheets of such glass-metals.

A ductile coating such as a nickel based coating 0.1 to 3.0 microns thick may be applied to the outer surfaces of the plies so that in the micron range the outer surfaces receive a form-locking shape, whereby these outer surfaces are and bonded to the rough machine part surfaces to be joined. This feature dissipates stress peaks by means of plastic deformation in the micron range, for example of the nickel based coating. These deformations make shape mating or form-locking slip-resistant impressions of the rough machine part surface in the ductile coating of the outer surfaces of the foils or plies.

For smooth machine part surfaces it is advantageous if the outer surfaces of the plies are coated or inlaid with a friction increasing granular material such as a ceramic powder, e.g. boron carbide, tungsten carbide, or silicon carbide. Such a grainy coating which may, for example be embedded in a nickel based layer, ensures that the foil outer surfaces do not slip relative to the smooth machine part surfaces.

Furthermore, according to the invention a microscopic shiftability or slideability is provided between the respective contact surfaces of the plies facing each other. Such a feature is preferably and advantageously achieved in that at least one of the two contact surfaces facing each other is coated with a soft glide coating of silver or copper or a high temperature varnish or a molybdenum or graphite containing compound.

For highly loaded joints of machine parts it is advantageous that at least one of the two contact surfaces of the intermediate foils or plies facing each other, is coated with a smooth abrasion resistant glide surface of cobalt or chromium oxide.

According to a further advantageous embodiment of the invention a combination or composite coating layer is formed on the contact surfaces of the intermediate layers, which contact surfaces face each other. This composite coating comprises a smooth abrasion resistant film and a soft glide film. In order to achieve this arrangement first a harder abrasion resistant film is applied and then the softer glide film is applied. On the one hand the composite coating allows an ideal gliding effect and on the other hand, it is simultaneously protected or resistant to abrasion and wear.

In situations where extreme fretting corrosion conditions prevail the soft gliding film is omitted and at least one of the two contact surfaces facing each other is preferably and advantageously coated with an ideal hard abrasion and wear resistant glide film of titanium nitride, tungsten carbide, or zirconium silicate.

In order to apply such glide films onto the contact surfaces of the plies, the plasma spray technique is especially advantageous. Plasma sprayed coatings or films of the above named material combinations are characterized by a high adhesion to the foil or ply surface material and by their high surface quality, whereby an essentially low friction gliding of the contact surfaces relative to each other may be achieved.

BRIEF DESCRIPTION OF THE DRAWINGS

In order that the invention may be clearly understood, it will now be described by way of example with reference to the accompanying drawings, wherein.

DETAILED DESCRIPTION OF PREFERRED EXAMPLE EMBODIMENTS AND OF THE BEST MODE OF THE INVENTION

Figure 1:
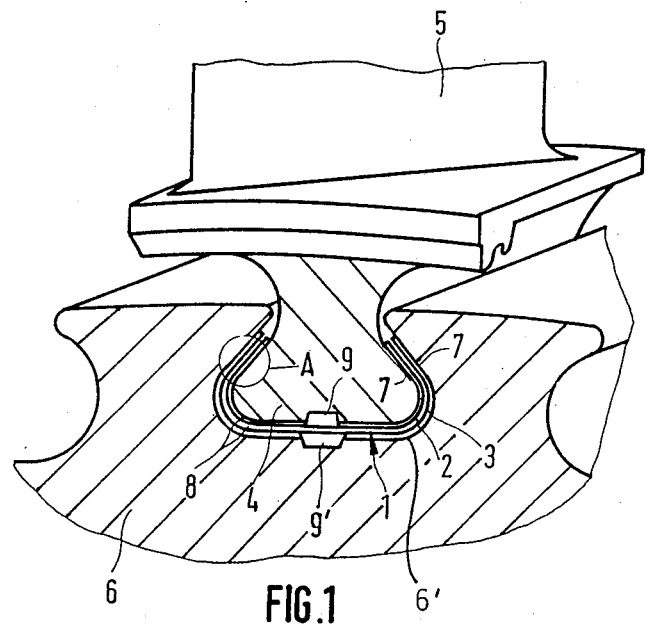
FIG. 1 is a sectional perspective view of a foil intermediate layer according to the invention inserted in the joint between a turbine rotor and the blade root of a compressor blade.

FIG. 1 shows a foil intermediate layer 1 comprising two foils or plies 2 and 3 for joining a blade root 4 of a compressor rotor blade 5 with a rotor disk 6 in the compressor stage of a turbine. The foil layers 2 and 3 are 0.03 m thick stainless steel foils (0.1C-12Cr-2.5Ni-1.8 Mo) which have been sandblasted on their respective outer surfaces 7 and which have been highly polished on their respective inner contact surfaces 8. Then the so prepared foil layers 2 and 3 were shaped or fitted to form the foil intermediate layer 1 on the blade root 4 so that the sandblasted outer surface 7 of the foil 2 contacts the blade root 4 and the sandblasted outer surface 7 of the foil 3 contacts the groove walls 6' of the rotor disk 6 of the compressor stage of the turbine engine. A flange or rim 9 of the ply or foil 2 fits into a groove of the blade root 4 to prevent the foil 2 from individually sliding in an axial direction. A similar flange or rim 9' of the ply 3 fits into a groove of the rotor disk 6 to prevent the foil or ply 3 from individually sliding in an axial direction. The highly polished contact surfaces 8 of the foils 2 and 3 contact each other in a low friction sliding manner so that axial components of vibrations and oscillating loads cannot act as shear forces, whereby microcracks are prevented from arising in the foil material and fretting corrosion is prevented at the joint surfaces of the blade root 4 and the rotor disk 6. Hence, cracks also do not occur in the surfaces forming the joint.

Figure 2:
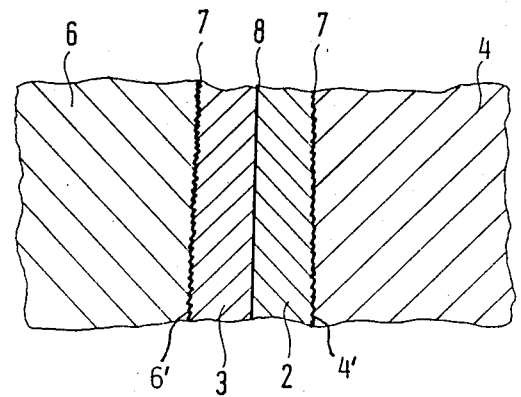
FIG. 2 is a sectional view of a detail A of FIG. 1 on an enlarged scale.

FIG. 2 shows the detail A of FIG. 1 on an enlarged scale. The sandblasted outer surfaces 7 of the foils 2 and 3 form a slip-free joint respectively with the slightly rough surface 4' of a blade root 4 and with the slightly rough surface 6' of the rotor disk 6. The highly polished inner contact surfaces 8 of the foils 2 and 3 contact each other in a gliding manner.

Figure 3:
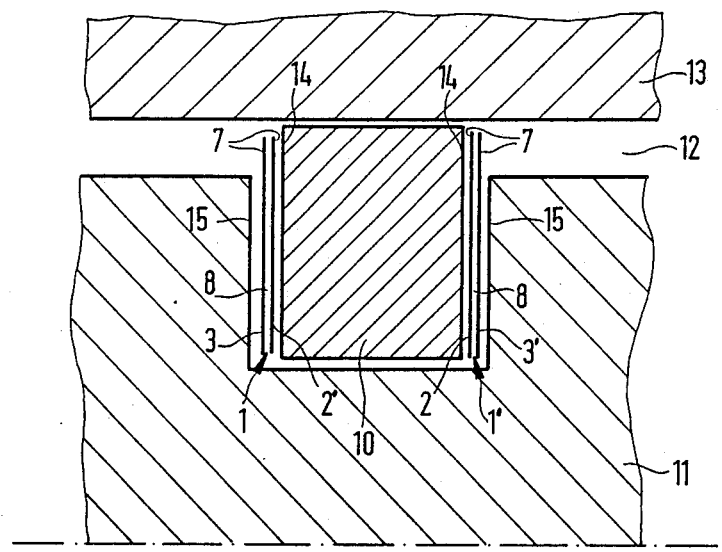
FIG. 3 is a partial axial sectional view of a foil intermediate layer used between a piston ring and the differential shaft of a jet engine.

FIG. 3 shows washer shaped or annular disk shaped foil or ply intermediate layers 1' arranged on both sides of a piston ring 10 secured to a differential shaft 11. The piston ring 10 seals an annular cylindrical gap 12 between the hollow shaft 13 and the differential shaft 11. The foil intermediate layer 1' comprises at least two foils 2' and 3' on each side of the piston ring 10 for protecting the washer shaped side surfaces 14 of the piston ring 10 and the washer shaped groove surfaces 15 of the differential shaft 11 against fretting corrosion. In this case, the foil material is 0.07 mm thick and made of a nickel based material (0.1C-22Cr-18Fe-9 Mo the remainder being nickel) which is coated on the foil outer surfaces 7 with a three micron thick nickel based coating or film into which silicon carbide particles of 0.2 to 4 micron grain size have been embedded to increase the coefficient of friction. The contact surfaces 8 of the foils 2' and 3' are coated with a 0.3 micron thick combination or composite coating or film as a gliding layer of abrasion and wear resistant cobalt/chrome oxide and soft molybdenum sulfide.

Figure 4:
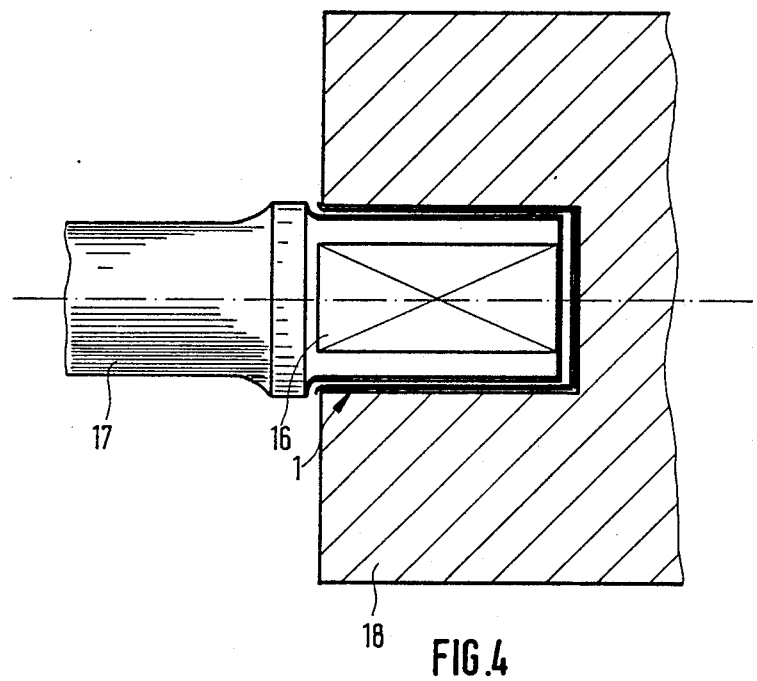
FIG. 4 is a partial sectional view of a cup-shaped foil intermediate layer for the clamped end of a torsion rod.

FIG. 4 shows a cup-shaped foil intermediate layer 1a as a fretting corrosion protection for the clamped end 16 of a torsion rod 17 in a clamping block 18, whereby the cobalt based foil material (0.1C-20Cr-15W-10Ni the remainder being cobalt) has been oxide blasted on the outer surfaces of the plies contacting the joint forming surfaces and silver coated on the inner ply surfaces contacting each other. The arrangement of the foils or plies is similar to that described and shown above with reference to FIGS. 1 to 3 and hence FIG. 4 is not shown nor described in further detail. Incidentally, "oxide blasted" in this context means blasting by means of aluminum oxide particles.

Figure 5:
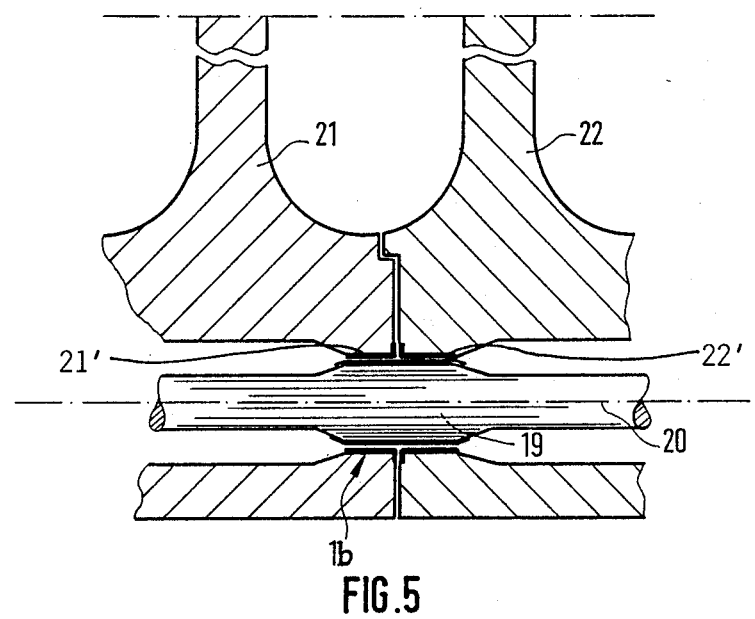
FIG. 5 is a partial sectional view of a foil intermediate layer surrounding the centering collar of a necked bolt.

FIG. 5 shows a cylindrically shaped foil intermediate layer 1b for joining a centering collar 19 of a necked bolt 20 with the walls 21' and 22' of the centering bore of compressor rotor disks 21 and 22. The cylindrical foil sleeves forming the foil intermediate layer 1b are made of stainless steel, whereby the surfaces of the foils or plies contacting each other are highly polished and coated with a high temperature lacquer or varnish and the cylindrical outer surfaces are shot-peened or blasted.

Figure 6:
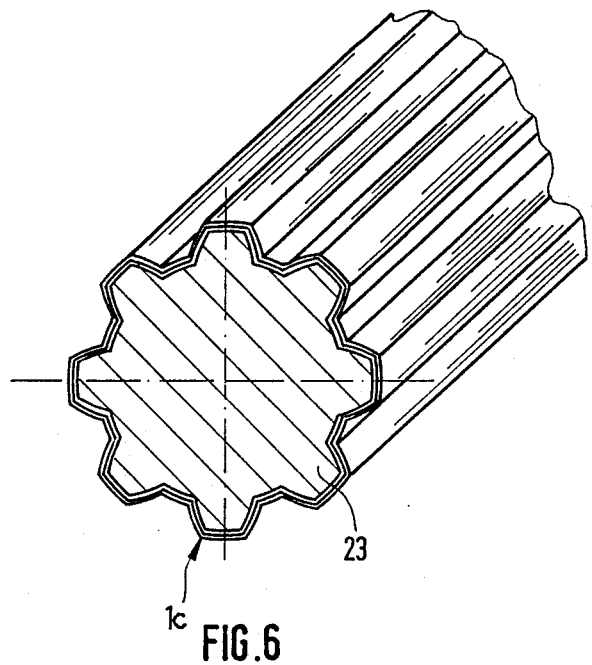
FIG. 6 is a perspective sectional view of a foil intermediate layer surrounding a fluted spline shaft.

FIG. 6 shows a foil intermediate layer 1c applied to a fluted or splined shaft 23. The foil base material is 0.3 mm thick and made of a nickel based alloy. The outer surfaces of the foil are coated with a 0.5 micron thick shot-peened or blasted ductile nickel based film and the foil contact surfaces are coated with a soft gliding film of 0.1 micron thick copper.

Figure 7:
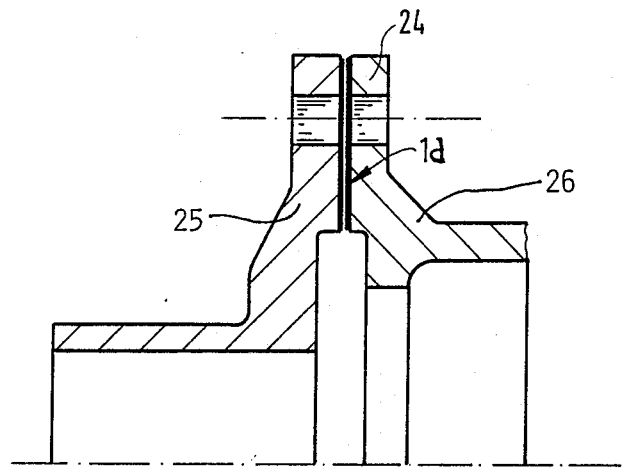
FIG. 7 is a cross-sectional view of a foil intermediate layer between two machine parts joined by two flanges.

FIG. 7 shows a foil intermediate layer 1d for protecting the flange connection 24 of two vibrationally loaded machine parts 25 and 26. The foil intermediate layer 1d comprises a glass metal foil of an iron nickel boron alloy. The contact surfaces of the foils or plies facing each other are highly polished and coated with a plasma spray coating of nickel, aluminum, and zirconium oxide forming a glide film. The foil outer surfaces are coated with a two micron thick nickel layer into which tungsten carbide particles with a 0.1 to 2.5 micron grain size have been embedded to increase the coefficient of friction.

Although the invention has been described with reference to specific example embodiments, it will be appreciated that it is intended to cover all modifications and equivalents within the scope of the appended claims.

What we claim is:

1. A foil intermediate layer for use between adjoining machine parts forming a joint, comprising a plurality of foils or plies, having inner foil contact surfaces directly contacting each other, and outer foil surfaces contacting respective ones of said machine parts, said inner contact surfaces comprising a lower coefficient of friction and a higher resistance to wear and abrasion than said outer foil surfaces for permitting relative motion between said inner foil contact surfaces, and wherein said foils or plies are made of a material selected from the group consisting of stainless steel, nickel based alloys, cobalt based alloys, and of the same materials of which said machine parts are made.

2. The foil intermediate layer of claim 1, wherein each of said foils or plies has a thickness between 0.01 and 0.07 mm.

3. The foil intermediate layer of claim 2, wherein each said foil or ply thickness is between 0.03 and 0.05 mm.

4. The foil intermediate layer of claim 1, wherein each of said foils or plies comprises an amorphous material structure.

5. The foil intermediate layer of claim 1, wherein said outer foil surfaces are treated by any one of: surface abrading, sandblasting, and shot-peening for changing a characteristic of said outer foil surfaces.

6. The foil intermediate layer of claim 1, further comprising an outer coating or film applied to at least one of said outer foil surfaces.

7. The foil intermediate layer of claim 6, wherein said outer coating is a ductile film.

8. The foil intermediate layer of claim 7, wherein said outer coating is a nickel-based film.

9. The foil intermediate layer of claim 6, wherein said outer coating comprises a granular ceramic powder for providing an increased friction.

10. The foil intermediate layer of claim 9, wherein said ceramic powder comprises a material selected from the group consisting of boron carbide, tungsten carbide, and silicon carbide.

11. The foil intermediate layer of claim 1, further comprising an inner coating applied to at least one of said inner foil surfaces for reducing friction.

12. The foil intermediate layer of claim 11, wherein said inner coating is a smooth, soft glide film.

13. The foil intermediate layer of claim 12, wherein said glide film comprises a material selected from the group consisting of silver, high temperature lacquer, molybdenum-containing material, and graphite-containing material.

14. The foil intermediate layer of claim 11, wherein said inner coating is a smooth, wear and abrasion resistant film.

15. The foil intermediate layer of claim 14, wherein said wear and abrasion resistant film comprises a material selected from the group consisting of cobalt, chrome oxide, titanium nitride, tungsten carbide, and zirconium silicate.

16. The foil intermediate layer of claim 11, wherein said inner coating is a plasma spray coating.

* * * * *